(12) United States Patent
Lester et al.

(10) Patent No.: US 7,676,833 B2
(45) Date of Patent: Mar. 9, 2010

(54) LOGIN SCREEN WITH IDENTIFYING DATA

(75) Inventors: Erren Dusan Lester, Renton, WA (US); Jason C Fluegel, Redmond, WA (US); Jeffrey Steinbok, Redmond, WA (US); Katrina M Blanch, Redmond, WA (US); Mark K Wong, Redmond, WA (US); Ranjib S Badh, Sammamish, WA (US); Rui Chen, Redmond, WA (US); Trevin M Chow, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 996 days.

(21) Appl. No.: 11/279,926

(22) Filed: Apr. 17, 2006

(65) Prior Publication Data

US 2007/0245407 A1    Oct. 18, 2007

(51) Int. Cl.
*G06F 7/04* (2006.01)
*G06F 17/30* (2006.01)
*H04L 9/32* (2006.01)
*G06F 15/16* (2006.01)
*H04L 29/06* (2006.01)

(52) U.S. Cl. .................... 726/5; 726/2; 709/203; 709/206

(58) Field of Classification Search .............. 726/5, 726/2; 709/203, 206
See application file for complete search history.

(56) References Cited

U.S. PATENT DOCUMENTS

| 6,735,569 B1 * | 5/2004 | Wizig ............................ 705/4 |
| 2004/0044588 A1 * | 3/2004 | Smith et al. .................... 705/27 |
| 2005/0097180 A1 * | 5/2005 | Abdelhak ...................... 709/208 |
| 2006/0143569 A1 * | 6/2006 | Kinsella et al. ............... 715/752 |
| 2006/0143697 A1 * | 6/2006 | Badenell et al. ................ 726/10 |
| 2006/0168066 A1 * | 7/2006 | Helsper et al. ............... 709/206 |
| 2007/0143415 A1 * | 6/2007 | Daigle .......................... 709/206 |
| 2007/0157304 A1 * | 7/2007 | Logan et al. ................... 726/12 |
| 2007/0266114 A1 * | 11/2007 | Heo ............................. 709/217 |
| 2008/0195699 A1 * | 8/2008 | Min et al. ..................... 709/203 |

* cited by examiner

*Primary Examiner*—Shin-Hon Chen
(74) *Attorney, Agent, or Firm*—Lee & Hayes, PLLC

(57) ABSTRACT

Techniques are described which may be employed to provide a login screen with identifying data. In an implementation, a login screen is displayed having an image that identifies a user. Credentials are received via the login screen to log the user onto a service provider over a network.

19 Claims, 7 Drawing Sheets

LOGIN SCREEN WITH IDENTIFYING DATA

BACKGROUND

Initially, users were limited to functionality that was available locally on their respective computers, such as through execution of applications and games on processors of the computer, accessing local storage of data from a memory of the computer, and so on. With the advent of the Internet, however, users gained access to a wide variety of functionality from all over the world, such as to web pages, downloadable songs, "ecommerce" electronic bill payers, and other web services.

In some instances, however, access to all or parts of the functionality is limited to particular users. Therefore, credentials may be supplied by the users (e.g., user name and password) to authenticate the user, i.e., to determine the identity of the user and whether the user is permitted to access the functionality.

Traditional techniques that were used by users to login to the web services, however, were impersonal and therefore "distanced" the user from the experience. For example, once the user was logged on to a web service, the user may obtain data that is personal to the user to personalize the user's experience with the web service. Before that logon, however, information output to the user using traditional techniques did not differentiate that user from any other user that attempted to access the web service.

SUMMARY

Techniques are described which may be employed to provide a login screen with identifying data. In an implementation, a login screen is displayed that has data that identifies a user. Credentials are then received via the login screen to log the user onto a service provider over a network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

Traditional techniques that were used by a user to login to a web service are impersonal and therefore "distance" the user from the experience. For example, once the user was logged on to a web service, the user may obtain data that is personal and customizable by the user. Before that logon, however, information output to the user using traditional techniques did not differentiate that user from any other user that attempted to access the web service.

Techniques are described that provide data that identifies a user (e.g., identity data such as user tiles, personal status messages, and so on) to be output in a login screen before a user logs in to a service provider, e.g., a web service provider. For example, the login screen may be configured to include a user tile and user name that, when selected, enable the user to enter credentials that are communicated over a network to the service provide to authenticate the user. Thus, the user may be provided with personalized experience before the service provider verifies the user or even knows that the user is about to attempt and/or is attempting to login to the service provider.

Additionally, this data may be "roamed" between clients (e.g., computing devices) that are used by the user to access the service provide. For example, a user may employ a desktop computer and a laptop computer that both use the identity data obtained from a common location over a network. Further, changes made to the identity data may be promulgated between the clients (e.g., the desktop computer and the laptop computer) such that once a change is made using one of the clients, the changed identifying data may be automatically obtained by the other clients.

In the following discussion, an exemplary environment is first described that is operable to perform techniques to provide a login screen with identifying data. Exemplary procedures and user interfaces are then described that may be employed in the exemplary environment, as well as in other environments.

Exemplary Environment

Figure 1:
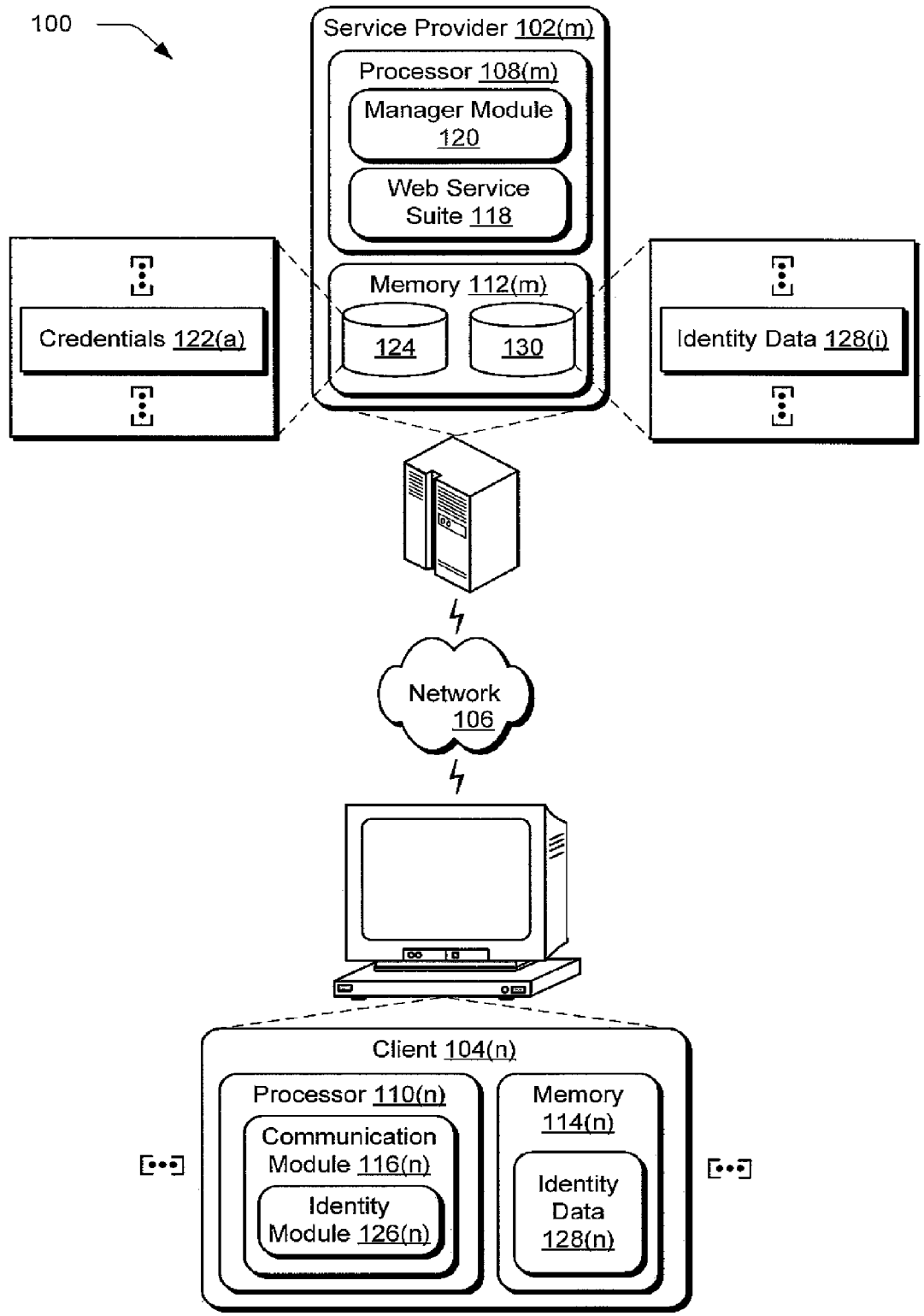
FIG. 1 is an illustration of an environment in an exemplary implementation that is operable to employ identifying data within a login screen techniques.

FIG. 1 is an illustration of an environment 100 in an exemplary implementation that is operable to employ techniques to provide identifying data within a login screen. The illustrated environment 100 includes one or more content providers 102(m) (where "m" can be any integer from one to "M") and one or more clients 104(n) (where "n" can be any integer from one to "N") that are communicatively coupled, one to another, via a network 106. In the following discussion, the service provider 102(m) and the client 104(n) may be representative of one or more entities, and therefore reference may be made to a single entity (e.g., the client 104(n)) or multiple entities, e.g., the clients 104(n), the plurality of clients 104(n), and so on.

The clients 104(n) may be configured in a variety of ways for network 106 access. For example, one or more of the clients 104(n) may be configured as a computing device, such as a desktop computer, a mobile station, an entertainment appliance, a set-top box communicatively coupled to a display device, a wireless phone, a game console, and so forth. Thus, the clients 104(n) may range from full resource devices with substantial memory and processor resources (e.g., personal computers, game consoles) to low-resource devices with limited memory and/or processing resources (e.g., traditional set-top boxes, hand-held game consoles). The clients 104(n), in portions of the following discussion, may also relate to a person and/or entity that operate the clients. In other words, one or more of the clients 104(n) may describe logical clients that include users, software, and/or devices.

The service provider 102(m) is illustrated in FIG. 1 as being implemented by a server and the client 104(n) is illustrated as a client device, each of which having respective processors 108(m), 110(n) and memory 112(m), 114(n). Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 112(m), 114(n) is shown, respectively, for the service provider 102(m) and the client 104(n), a wide variety of types and combinations of memory may be employed, such as random access memory (RAM), hard disk memory, removable medium memory, and other types of computer-readable media.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The client 104(n) is illustrated as executing a communication module 116(n) on the processor 110(n), which is also storable in memory 114(n). The communication module 116(n) is representative of an executable module that is configured to communicate with the service provider 102(m) over the network 106. For example, the communication module 116(n) may be configured as a web browser that allows the client 104(n) to "surf" the Internet. In another example, the communication module 116(n) is configured as a "smart" client module that is configured to provide other network functionality as a part of its operation, such as an instant messaging module, an email module, an online banking module, and so on. A wide variety of other examples are also contemplated.

The client 104(n), for instance, may execute the communication module 116(n) to access a web service suite 118 that includes a collection of web services that offer functionality to the client 104(n). For example, the web services may include email, instant messaging, client maintenance services, web logs, "spaces", photo storage, and so on.

The client 104(n), through execution of the communication module 116(n), may communicate with the service provider 102(m) over the network. To obtain access to the services provided by the service provider 102(m) (e.g., the web service suite 118), the client 104(n) may provide credentials, such as user name and password. The service provider 102(m), through execution of the manager module 120, compares the received credentials with credentials 122(a) (where "a" can be any integer from one to "A") stored in storage 124 in the memory 112(m) to determine whether a user of the client "is who they say they are". When authenticated, the client 104(n) is then given access to the web service suite 118.

To provide a personalized experience before login to the service provider 102(m), the communication module 116(n) may include an identity module 126(n). The identity module 126(n) is representative of functionality that provides identity data 128(n) during a login process to the service provider 102(m), even before the client 104(n) successfully logs in to the service provider 102(m). For example, a user tile may be selected by the user as an external representation of the user to other users, such as during an instant messaging session. This user tile may also be output as a part of a login screen that is used to log the user into the service provider 102(m). Additionally, the user tile may be selectable to automatically provide all or a portion of the credentials used to log the user into the service provider 102(m), such as by providing the user name and/or password when the user "clicks" on the user tile using a cursor control device.

Further, the service provider 102(m) may also be configured to maintain identity data 128(i) (where "i" can be any integer from one to "I") in storage 130 such that the identity data 128(i) may "roam" over the network 106. The user, for example, may use a plurality of clients, such as a desktop PC, a laptop computer and a wireless phone. The identity data 128(i) particular to the user may be shared by each of the clients such that the personalized login experience may be provided regardless of the client being used by the user. Additionally, changes to the identity data made using one of the clients (e.g., the desktop computer) may be promulgated to other client devices, such as the laptop computer and wireless phone. Further, this promulgation may be performed automatically through execution of the identity module 126(n) and/or manager module 120 such that manual updating by the user is not necessary. Further discussion of identity data used in conjunction with a login over a network may be found in relation to the following figures.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, e.g., memory 112(m), 114(n). The features of the techniques to provide identifying data before login described below are platform-independent, meaning that the techniques may be implemented on a variety of commercial computing platforms having a variety of processors.

Figure 2:
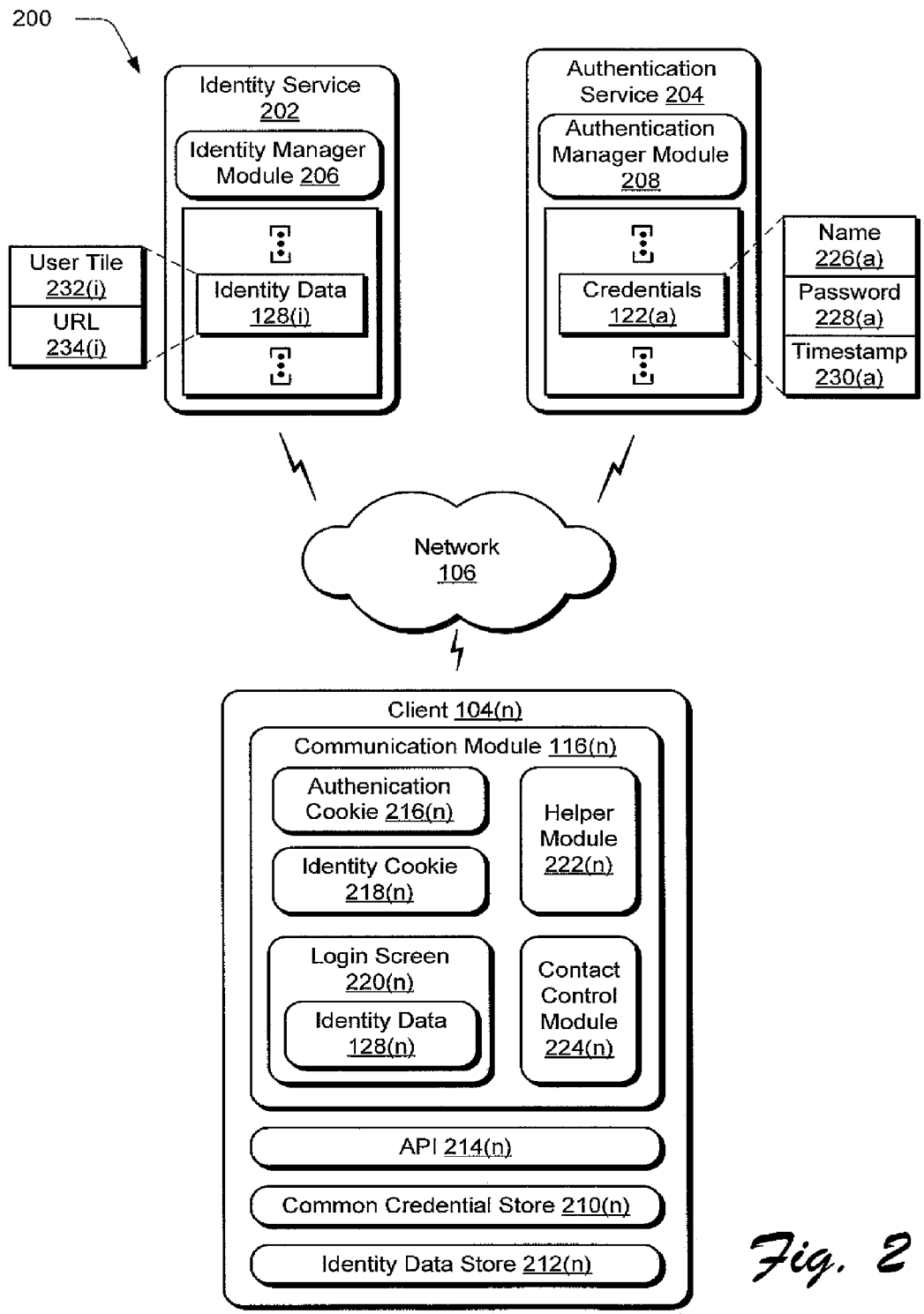
FIG. 2 is an illustration of a system in an exemplary implementation showing one or more service providers and one or more clients of FIG. 1 in greater detail.

FIG. 2 is an illustration of a system 200 in an exemplary implementation showing the service providers 102(m) and the client 104(n) of FIG. 1 in greater detail. The plurality of service providers 102(m) of FIG. 1 are illustrated in FIG. 2 as being implemented by an identity service 202 and an authentication service 204. The identity service 202 includes an identity manager module 206 and the identity data 128(i). Additionally, the authentication service 204 includes an authentication manager module 208 and the credentials 122(a). As should be readily apparent, even though the identity service 202 and the authentication service 204 are illustrated as stand-alone services in FIG. 2, these services may be combined as illustrated in FIG. 1 or further separated without departing from the spirit and scope thereof.

The client 104(n) is illustrated as including the communication module 104(n) and well as a common credential store 210(n) and an identity data store 212(n). The common credential store 210(n) and the identity data store 212(n) are accessible to the communication module 104(n) via an application programming interface (API) 214(n). The API 214(n), for instance, may be configured as a client runtime library that is responsible for updating to and reading from the common credential store 210(n) on behalf of the communication module 116(n).

The common credential store 210(n) is a "common" store in that it may be used by the client 104(n) to store credentials used by a plurality of web sites and applications obtained from multiple users of the client 104(n). For example, the common credential store 210(n) may store credentials of each member of a household that opted to save their account on the client 104(n), each employee of a business, students in a classroom, and so on.

The identity data store 212(n) may be configured in a variety of ways. For example, the identity data store 212(n) may include copies of identity data of users of the client 104(n). In other words, in this example the identity data is available locally on the client 104(n) instead of over the network 106. In another example, the identity data store 212(n) may include one or more uniform resource locators (URLs) that reference where the identity data may be obtained for particular users over the network 106. The URL, for instance, may be a network address of identity data 128(i) stored by the identity service 202 over the network 106. Therefore, the communication module 116(n), when executed, may examine the identity data store 212(n) to determine where, over the network 106, the identity data 128(i) that corresponds to a particular user may be found and retrieve that identity data 128(i). A variety of other examples are also contemplated, such as storage of identity data on both the client 104(n) and the service provider 102(m).

The communication module 116(n) of FIG. 2 is illustrated as implementing and being implemented by an authentication cookie 216(n), identity cookie 218(n), login screen 220(n) having identity data 128(n), a helper module 222(n) and a contact control module 224(n). The authentication cookie 216(n), for instance, may be received from the authentication service 204 when the user has been successfully authenticated, such as through comparison of credentials supplied by the client 104(n) over the network 106 with credentials 122(a) (e.g., name 226(a), password 228(a)) stored at the authentication service 204. The authentication cookie 216(n) may then be used by the client 104(n) to access other service providers 102(m) without resubmitting the credentials. The credentials 122(a) are further illustrated as including a timestamp 230(a), which may be used to indicate to the client 104(n) as to whether the identity data 128(n) of the client 104(n) is current. Further discussion of managing identity data to remain "current" may be found in relation to FIG. 7.

The helper module 222(n) is representative of functionality that provides interaction between the common credential store 210(n) and the identity service 202. For example, the helper module 222(n) may be configured as an "Active X" control that is used by the communication module 116(n), when configured as a browser, to communicate identity data 128(i) from the identity service 202 to the common credential store 210(n) and vice versa, such as when the client updates the identity data.

The contract control module 224(n) is representative of functionality that maintains the identity data used by the client 104(n), such as to ensure that the data is "current". For example, the user may provide a new user tile, which is stored in the identity data store 212(n). The new user tile may also be uploaded to the identity data 128(i) of the identity service 202 such that the new user tile may be provided to other clients used by the user. Additionally, as described above, the timestamp 230(a) may be provided when the new user tile is uploaded such that each client may determine whether the identity data is "current", and if not, obtain the current identity data.

The login screen 220(n) is illustrated as including identity data 128(n) of one or more users. For example, the login screen 220(n) may be configured to accept credentials to be communicated to the authentication service 204. Before the credentials are accepted, the login screen 220(n) may output identity data 128(n). For instance, the identity cookie 218(n) may be queried to determine a URL of identity data, such as a client tile 232(i) available via URL 234(i) at the identity service 202. The user tile 232(i) is then obtained and output in the login screen 220(n) as identity data 128(n). In another example, the identity data 128(n) may be obtained from the identity data store 212(n) and output in the login screen 220(n). A variety of other examples are also contemplated, further discussion of which may be found in relation to the following procedures.

Exemplary Procedures

The following discussion describes login screen with identifying data techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
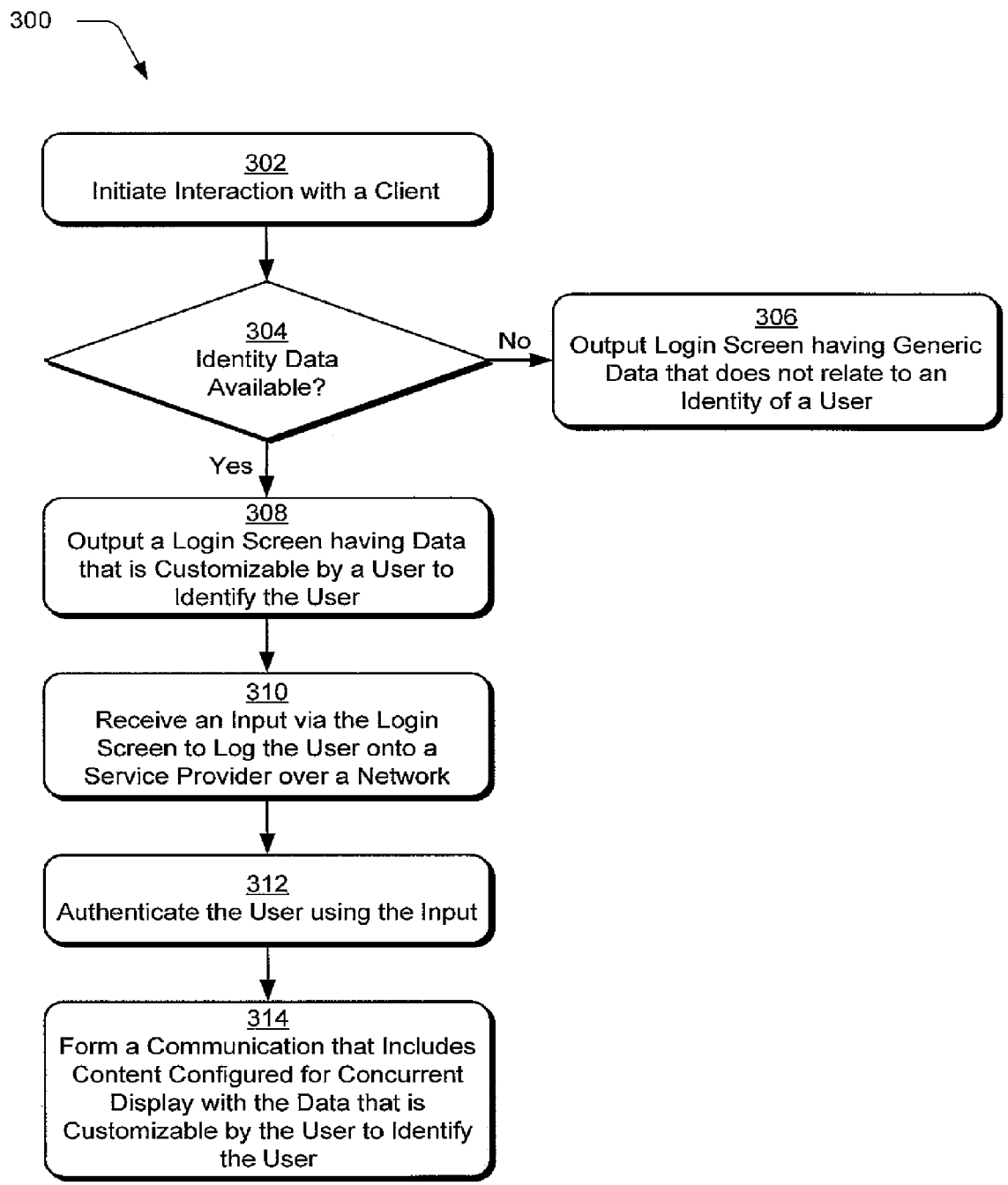
FIG. 3 is a flow diagram depicting a procedure in an exemplary implementation in which identifying data is output in a login screen before a user logs in to a service provider.

FIG. 3 depicts a procedure 300 in an exemplary implementation in which identifying data is output in a login screen before login by a user to a service provider. In the following discussion of FIG. 3, reference will also be made to the user interfaces 400, 500, 600 of respective FIGS. 4, 5 and 6.

Interaction with a client is initiated (block 302). For example, a user may power-on the client 104(n) of FIG. 2 and select an indication in a user interface to login to the service provider 102(m), such as by "double-clicking" an icon.

A determination is then made as to whether identity data is available (decision block 304). For example, the communication module 116(n) may determine whether there is an identity cookie 218(n) available, and if so, retrieve identity data 128(i) via a URL 234(i), such as retrieving the user tile 232(i) from over the network 106. In another example, the communication module 116(n) may determine whether identity data is available locally via the identity data store 212(n).

Figure 4:
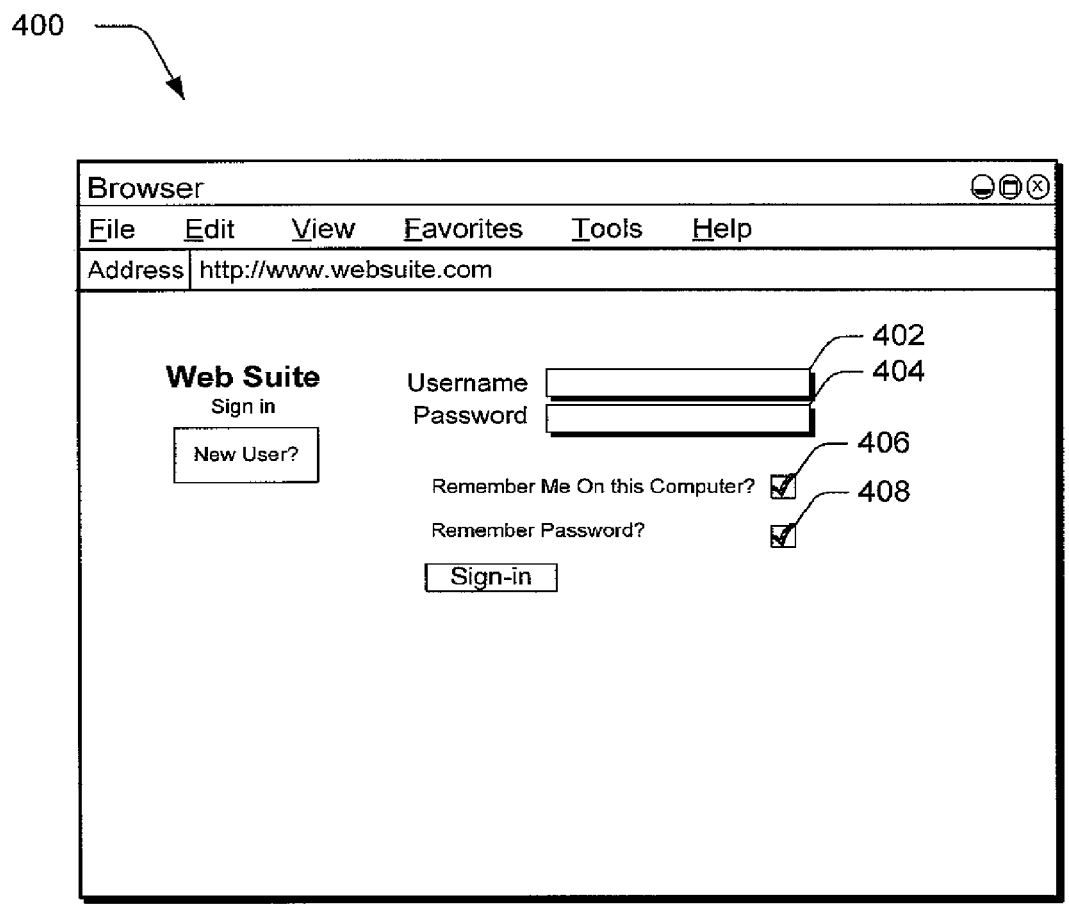
FIG. 4 is an illustration of an exemplary implementation of a user interface configured to provide credentials over a network that does not include identity data.

When identity data is not available ("no" from decision block 304), a login screen is output having generic data that does not relate to an identity of a user (block 306). FIG. 4, for instance, illustrates an exemplary implementation of a user interface 400 configured to provide credentials over a network that does not include identity data. The user interface 400 includes portions to enter a username 402 and password 404. Further, the user may select options to "remember me on this computer" 406 and "remember password" 408. The "remember me on this computer" 406 option, when selected, may provide for identity data of the user to be stored on the computer before login.

When identity data is available ("yes" from decision block 304), a login screen is output having data that is customizable by a user to identify the user (block 308). The user, for instance, may have previously logged in to the service provider 102(m) using the client 104(n) and selected the "remember me on this computer" 406 option of the user interface 400 of FIG. 4. Therefore, data is available to this computer (e.g., which may implement the client 104(n) of FIG. 2) for output in conjunction with a login screen.

Figure 5:
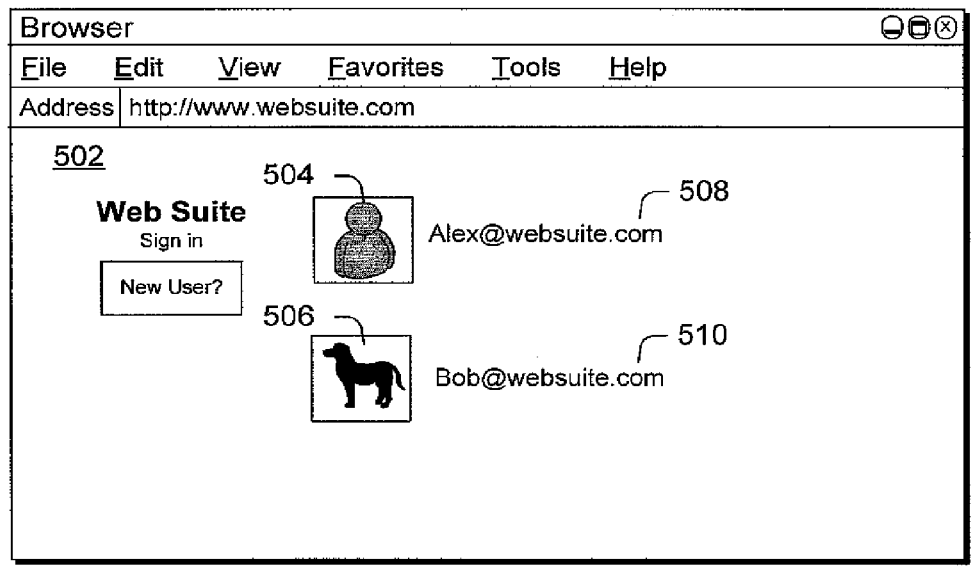
FIG. 5 is an illustration of an exemplary implementation of a user interface having a login screen configured to provide credentials over a network that includes identity data.

FIG. 5, for instance, illustrates an exemplary implementation of a user interface 500 configured to provide a login screen 502 having images that identify respective users. The login screen 502 includes images configured as user tiles 504, 506 with corresponding addresses 508, 510 of the users. As previously described, the images may be obtained from a variety of sources, such as local to the client 104(n) and/or remotely from over the network 106, e.g., from the identity service 202. In this way, the user is provided with a personalized login experience even before logging in to the service provider 102(m). Further, this data may be customizable such that the user may make changes to the data, such as through selection of a new image, textual greeting used during an instant messaging session, and so on.

The identity data (e.g., the images 504, 506 and the network addresses 508, 510) may be configured aid the user to log in to the service provider 102(m). For instance, the identity data may be selectable to provide all or part of the credentials used to log the user in to the service provider 102(m). A user, for example, may use a cursor control device to select the image 504 to cause credentials related to that user to be automatically "filled in" for communication over the network 106 to the service provider 102(m) to authenticate the user. In another example, selection of the image provides at least a part of the credentials, but leaves another part to be manually entered by the user, an example of which is shown in the following figure.

Figure 6:
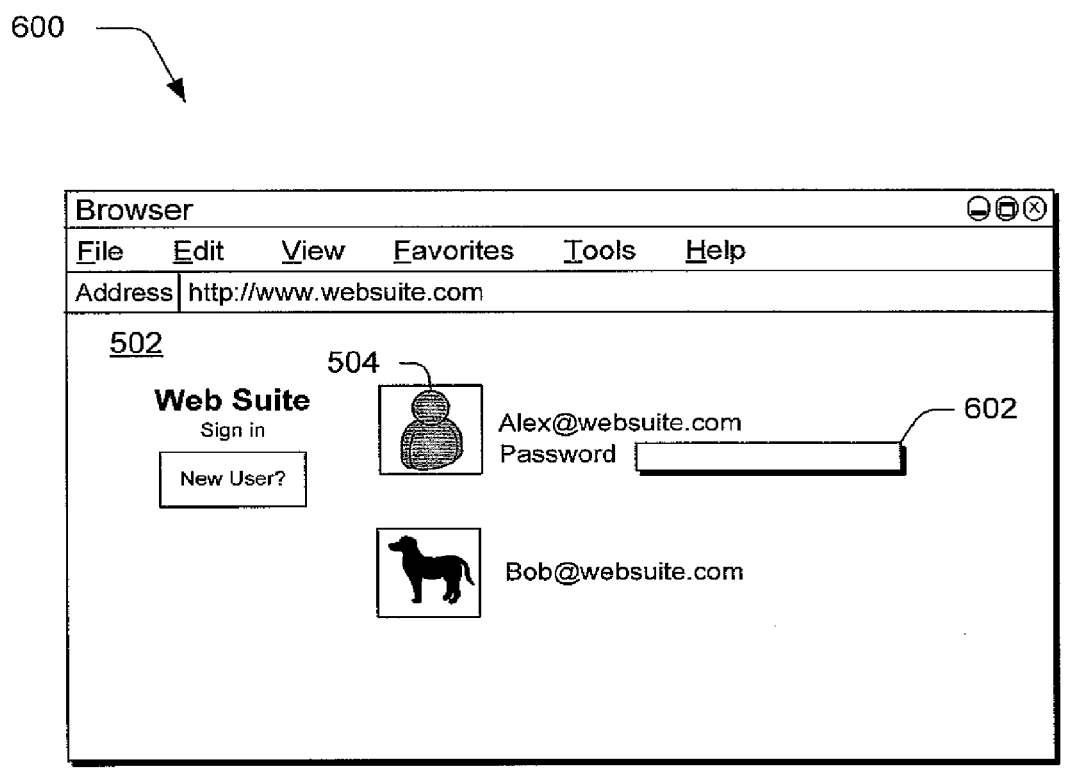
FIG. 6 is an illustration of an exemplary implementation of a user interface having the login screen of FIG. 5 as configured to accept an input from the user to provide credentials to login to a service provider.

FIG. 6, for instance, illustrates an exemplary implementation of a user interface 600 having the login screen 502 of FIG. 5 as configured to accept an input from the user to provide credentials to login to a service provider. Upon selection of the image 504, the user interface 502 outputs a portion 602 that is configured to receive additional credentials (e.g., a password) to be communicated along with credentials automatically supplied through selection of the image 504 (e.g., the user name) to the service provider 102(m). In this way, selection of the data that identifies the user initiates the login by supplying at least a portion of the credentials. A variety of other examples are also contemplated.

Returning now to the discussion of FIG. 3, an input is received via the login screen to log the user onto a service provider over a network (block 310). The login screen 502 of FIG. 5, for instance, may receive a password of the user. The user is then authenticated through use of the input (block 312). For example, the input may be communicated by the communication module 116(n) to the authentication service 204 for comparison with credentials 122(a) maintained by the service. When authenticated (e.g., the supplied credentials match the stored credentials), the authentication service 204 may communicate an authentication cookie 216(n) which enables the client 104(n) to access other service providers without resubmitting the credentials, e.g., access to the web service suite 116.

The web service suite 116, for instance, may form a communication that includes content configured for concurrent display with the data that is customizable by the user to identify the user (block 314). For instance, the user may access an instant messaging service included in the web service suite 118 which also uses the data (e.g., a user tile 232(i)) to represent the user in an instant messaging user interface, both to the user as well as other users during an instant messaging session. A variety of other examples are also contemplated.

Figure 7:
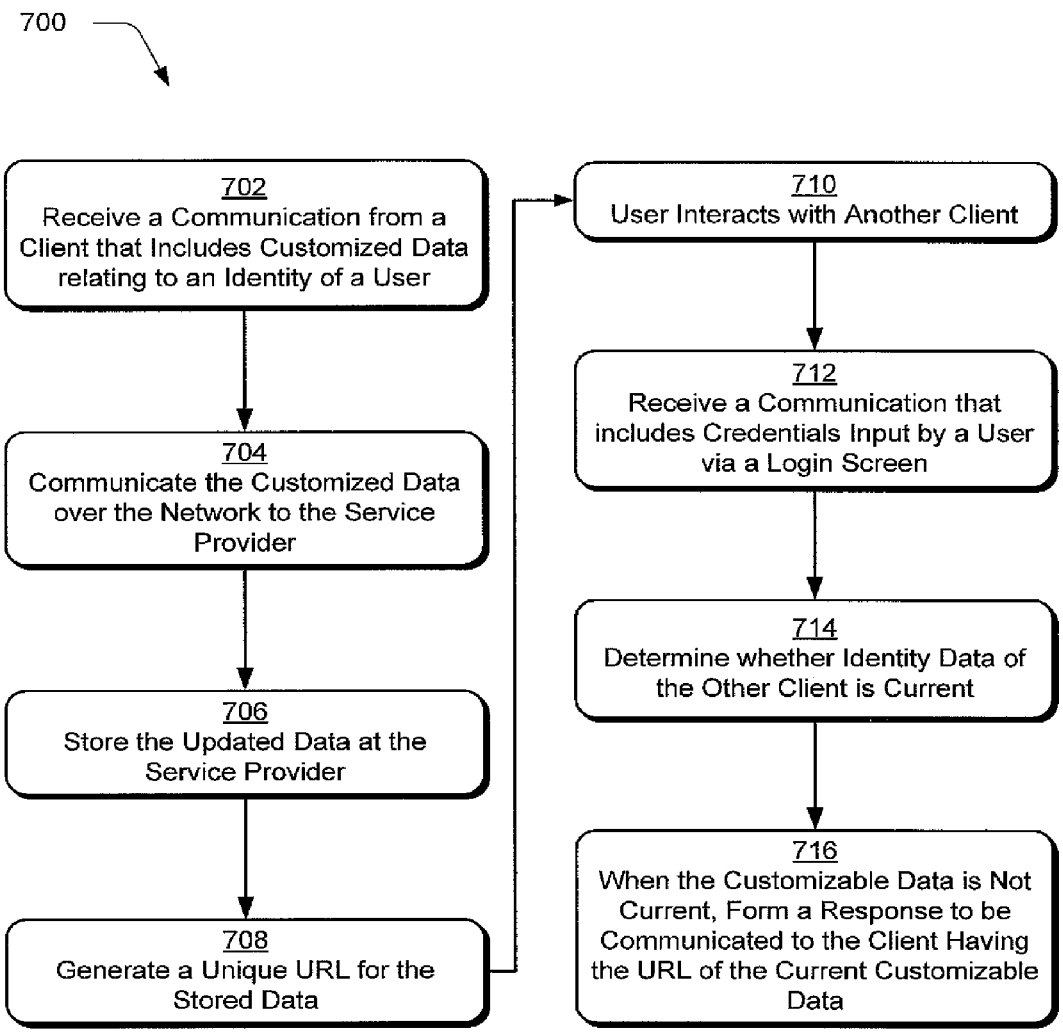
FIG. 7 is a flow diagram depicting a procedure in an exemplary implementation in which data used to identify a user in a logon screen is customized and the customizations populated for use by other clients.

FIG. 7 depicts a procedure 700 in an exemplary implementation in which data used to identify a user in a logon screen is customized and the customizations populated for use by other clients. A communication is received from a client that includes customized data relating to an identity of a user (block 702). For example, the communication may be formed as a result of user interaction that changes identity data of the user, such as an updated user tile, personalized message, and so on.

The customized data is then communicated over the network to the service provider (block 704). For instance, the user may interact with the communication module 116(n) to change a user tile. The user tile may then be stored by the communication module 116(n) through the API 214(n) in the identity data store 212(n) that is local to the client 104(n). Further, the communication module 116(n) may also communicate the user tile over the network 106.

The customized identity data (e.g., the user tile) is then stored at the identity service 202 as user tile 232(i) (block 706). To provide access to the customized identity data, a unique URL is generated for the stored data (block 708). For example, the identity manager module 206, when executed, may generate a URL having a combination of nonsensical characters that are difficult for a user to guess, e.g., "www.serviceprovider.com/identitydata/0515%!%". Therefore, access to the identity data may be provided to any user that has the URL, but the URL is difficult to guess by other users. Additionally, by providing such access to the identity data 128(k) over the network 106, the identity data may "roam" to other clients used by the user.

The user, for example, may interact with another client (block 710) and use that client to login to the service provider 102(m). Accordingly, the service provider receives a communication that includes credentials input by a user via a login screen (block 712), such as a user name and password. A determination is then made as to whether the identity data of the other client is current (block 714). For instance, the communication may include a timestamp that indicates a most recent version of identity data stored at the client. In another example, the timestamp may be communicated to the client to perform the determination. A variety of other examples are also contemplated.

When the customizable data is not current, a response is formed to be communicated to the client having the URL of the current customizable data (block 716). For example, the response may be sent after authentication when it is determined by the service provider 102(m) that the identity data stored at the client is not "up to date". In another example, the response may be sent after receipt of a request by the client for the URL after determination by the client that the identity data stored in the identity data store 212(n) is not current. A variety of other examples are also contemplated.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
    retrieving an uniform resource locator (URL) from a local data store, the URL pointing to a network location of a service provider that stores identity data, the identity data being customized by a user to identify the user;
    obtaining the identity data from the network location indicated by the URL;

outputting the identity data at a login screen as a selectable login prompt;

receiving credentials to log the user onto the service provider over a network after receiving a selection of the selectable login prompt;

determining availability of changed identity data that identifies the user on the service provider, the changed identity data being more current than the identity data; and requesting from the service provider an updated URL to the changed identity data when the changed identity data that identifies the user is available on the service provider.

2. A method as described in claim 1, wherein the identity data that identifies the user is an image previously selected by the user.

3. A method as described in claim 2, wherein the image is used to represent the user to another user when communicating with the other user over the network.

4. A method as described in claim 1, wherein the receiving includes receiving the credentials that are pre-stored on a credential store on a client that performs the outputting and the receiving.

5. A method as described in claim 1, wherein the receiving the credentials includes receiving at least one of a user name or a password that is entered at the login screen.

6. A method as described in claim 1, further comprising when the identity data that identifies the user in the login screen is not current, receiving a response from the service provider having a uniform resource locator (URL) of current identity data that identifies the user.

7. A method as described in claim 6, further comprising displaying the current data concurrently with content received from the service provider.

8. A method as described in claim 1, further comprising:

receiving changed identity data that identifies the user, the changed identity data being more current than the identity data; and communicating the changed identity data to the service provider.

9. A method as described in claim 1, further comprising receiving the updated URL to the changed identity data and storing the updated URL in the local data store.

10. A method comprising:

storing customized identity data that identifies a user at a network location of a service provider, the customized identity data for presentation as a selectable login prompt at a login screen of a client, the customized identity data being further referenced by a first uniform resource locator (URL) stored at a local data store of a client;

determining availability of changed identity data that identifies the user at the network location of the service provider, the changed identity data being more current than the customized identity data;

requesting from the service provider a second URL to the changed identity data when the changed identity data that identifies the user is available at the network location on the service provider;

receiving a response from the service provider at the client, the response having the second URL of the changed identity data that identifies the user; and presenting the changed identity data as the selectable login prompt on the login screen in place of the customized identity data.

11. A method as described in claim 10, wherein receiving the response includes receiving the response at the client after a user has logged onto the service provider from the client and the service provider determines that the client does not have current customized data.

12. A method as described in claim 10, wherein the changed identity data that identifies the user was received at the network location of the service provider in a communication from the user sent via another client.

13. A method as described in claim 10, wherein the determining availability of the changed identity data is based on a timestamp of the changed identity data.

14. A method as described in claim 10, wherein:

the second URL is generated by the service provider to include characters that decreases a likelihood that the second URL can be guessed.

15. One or more computer-readable storage media comprising executable instruction that, when executed, cause one or more processors to perform acts comprising:

retrieving an uniform resource locator (URL) from a local data store, the URL pointing to a network location of a service provider that stores identity data that includes an image, the identity data being customized by a user to identify the user;

obtaining the identity data from the network location indicated by the URL;

outputting a login screen to accept credentials to log a user onto a service provider over a network, wherein the login screen includes the identity data selected by the user to identify the user;

receiving credentials of the user via the login screen;

determining availability of changed identity data that identifies the user on the service provider, the changed identity data being more current than the identity data; and requesting from the service provider an updated URL to the changed identity data when the changed identity data that identifies the user is available on the service provider.

16. One or more computer-readable storage media as described in claim 15, wherein the service provider is configured to include a web service.

17. One or more computer-readable storage media as described in claim 15, wherein the service provider is configured to include a web service.

18. One or more computer-readable storage media as described in claim 15, further comprising an instruction that when executed, cause or more processors to perform an act of receiving a response from the service provider, the response having a uniform resource locator (URL) of a current image that identifies the user when the image that identifies the user in the login screen is not current.

19. One or more computer-readable storage media as described in claim 15, further comprising an instruction that when executed, cause one or more processors to perform an act of communicating an image that identifies the user, when changed, to the service provider.

* * * * *